(12) United States Patent
Oohigashi et al.

(10) Patent No.: US 9,829,204 B2
(45) Date of Patent: Nov. 28, 2017

(54) WATER HEATER INCLUDING HEAT EXCHANGER

(71) Applicant: NORITZ CORPORATION, Hyogo (JP)

(72) Inventors: Takeshi Oohigashi, Kakogawa (JP); Makoto Hirotsu, Akashi (JP); Yukiko Noguchi, Kakogawa (JP)

(73) Assignee: NORITZ CORPORATION, Hyogo (JP)

( * ) Notice: Subject to any disclaimer, the term of this patent is extended or adjusted under 35 U.S.C. 154(b) by 330 days.

(21) Appl. No.: 14/095,948

(22) Filed: Dec. 3, 2013

(65) Prior Publication Data

US 2014/0174382 A1    Jun. 26, 2014

(30) Foreign Application Priority Data

Dec. 26, 2012   (JP) .................................. 2012-282773

(51) Int. Cl.
*F24F 1/24*      (2011.01)
*F24H 8/00*      (2006.01)
(Continued)

(52) U.S. Cl.
CPC ................. *F24F 1/24* (2013.01); *F24H 8/00* (2013.01); *F24H 9/146* (2013.01); *F28D 7/085* (2013.01); *F28F 1/32* (2013.01); *Y02B 30/102* (2013.01)

(58) Field of Classification Search
CPC ... F28D 1/0477; F28F 1/24; F28F 1/30; F28F 1/325; F24H 9/00; F24H 1/124; F24H 1/145
(Continued)

(56) References Cited

U.S. PATENT DOCUMENTS

| | | | | |
|---|---|---|---|---|
| 3,994,336 A | * | 11/1976 | Pessolano | F24H 6/00 122/33 |
| 2008/0028610 A1 | * | 2/2008 | Chen | B21D 53/085 29/890.03 |
| 2011/0155079 A1 | * | 6/2011 | Matsunaga | F24H 1/40 122/15.1 |

FOREIGN PATENT DOCUMENTS

CN     201803632 U     4/2011
CN     202582321 U     12/2012
(Continued)

OTHER PUBLICATIONS

The First Office Action; "Grounds for Rejection," issued by the Chinese Patent Office dated Jul. 3, 2015, which corresponds to Chinese Patent Application No. 201310616891.9 and is related to U.S. Appl. No. 14/095,948; with English language translation.

(Continued)

*Primary Examiner* — Steven B McAllister
*Assistant Examiner* — Ko-Wei Lin
(74) *Attorney, Agent, or Firm* — Studebaker & Brackett PC

(57) ABSTRACT

In a primary heat exchanger, a heat conduction pipe is arranged as one connected pipe in a lower stage and an upper stage in a manner extending back and forth through a plurality of fins. The heat conduction pipe is arranged such that a pitch between the heat conduction pipes in the upper stage is shorter than a pitch between the heat conduction pipes in the lower stage. In addition, the heat conduction pipe is arranged such that a position in a center of each heat conduction pipe in the upper stage in a second direction orthogonal to a first direction in which the heat conduction pipe extends and a position in a center of each heat conduction pipe in the lower stage in the second direction are displaced from each other.

12 Claims, 15 Drawing Sheets

(51) Int. Cl.
*F24H 9/14* (2006.01)
*F28D 7/08* (2006.01)
*F28F 1/32* (2006.01)

(58) Field of Classification Search
USPC .......... 122/15.1, 18.1, 32, 33, 31.1; 165/182
See application file for complete search history.

(56) References Cited

FOREIGN PATENT DOCUMENTS

| | | |
|---|---|---|
| JP | S58-87037 U | 6/1983 |
| JP | 03-000546 U | 1/1991 |
| JP | 08-200819 A | 8/1996 |
| JP | 2006-349234 A | 12/2006 |
| JP | 2010-139110 A | 6/2010 |
| JP | 2011027352 A * | 2/2011 |

OTHER PUBLICATIONS

An Office Action; "Notice of Grounds for Rejection," issued by the Japanese Patent Office dated Oct. 4, 2016, which corresponds to Japanese Patent Application No. 2012-282773 and is related to U.S. Appl. No. 14/095,948; with English language translation.

* cited by examiner

DRAIN GAS    HOT WATER    INCOMING
             DELIVERY     WATER

FIG.14
(A)
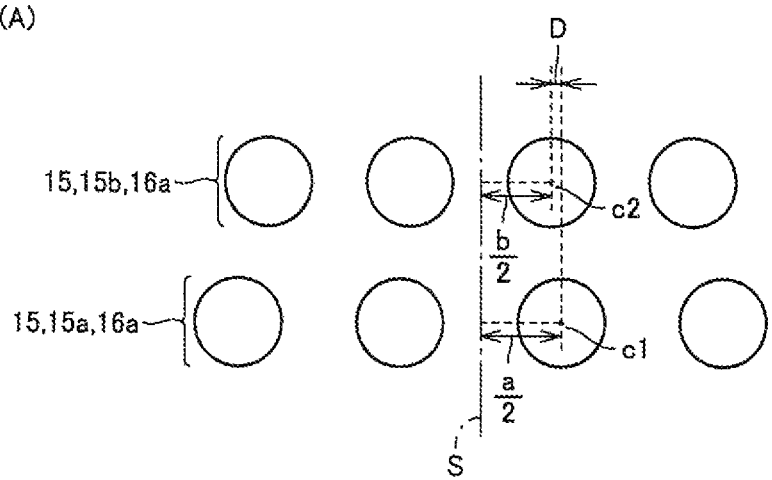
(B)
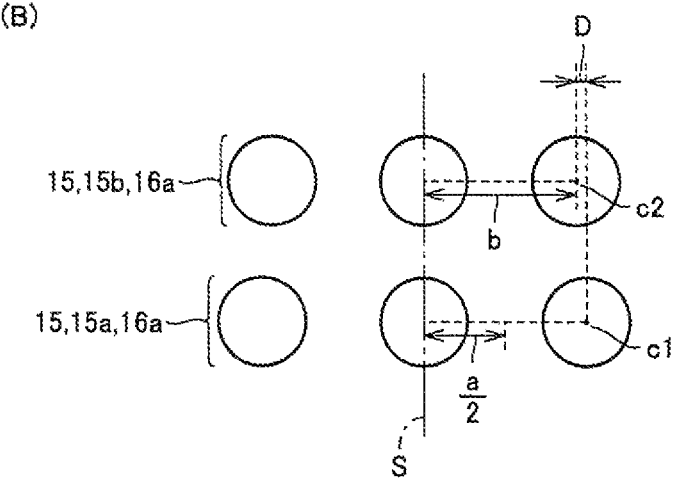

WATER HEATER INCLUDING HEAT EXCHANGER

BACKGROUND OF THE INVENTION

Field of the Invention

The present invention relates to a heat exchanger and a water heater including the heat exchanger.

Description of the Background Art

A heat exchanger is mainly constituted of a plurality of plate-shaped fins, a heat conduction pipe passing through the fins, a water supply pipe and a hot water delivery pipe connected to the heat conduction pipe, a shell plate serving as an exterior, and the like. In a water heater, for example, a burner sending a combustion gas to the heat exchanger is arranged in a lower portion of the heat exchanger. The heat conduction pipe is arranged as one connected pipe, on a side closer to the burner (a lower stage) and on a side farther therefrom (an upper stage), such that it extends back and forth through the fins. The water supply pipe is connected to one end side of the heat conduction pipe such that water flows from the heat conduction pipe arranged in the lower stage closer to the burner to the heat conduction pipe arranged in the upper stage, and the hot water delivery pipe is connected to the other end side located opposite thereto.

In the heat exchanger, in a cross-section in a direction substantially orthogonal to a direction of extension of the heat conduction pipe, when the heat conduction pipe is arranged such that the number of heat conduction pipes (cross-sections) arranged in the lower stage is the same as the number of heat conduction pipes (cross-sections) arranged in the upper stage, the heat conduction pipe is arranged such that the cross-sections of the heat conduction pipe are disposed in grids. On the other hand, when the heat conduction pipe is arranged such that the number of heat conduction pipes (cross-sections) arranged in the lower stage is different from the number of heat conduction pipes (cross-sections) arranged in the upper stage, the heat conduction pipe is arranged such that the cross-sections of the heat conduction pipes are disposed as staggered.

Japanese Patent Laying-Open No. 2006-349234, Japanese Utility Model Laying-Open No. 03-546, and Japanese Patent Laying-Open No. 08-200819 each disclose such a heat exchanger that a heat conduction pipe is arranged in a lower stage and an upper stage.

Conventionally, in particular in a heat exchanger adopting such an arrangement that a heat conduction pipe is disposed in grids in a lower stage and an upper stage, when a pitch between heat conduction pipes arranged in the lower stage is the same as a pitch between heat conduction pipes arranged in the upper stage, a portion directly under the heat conduction pipe in the upper stage located downstream of a flow of a combustion gas is hidden behind the heat conduction pipe in the lower stage. Therefore, the combustion gas cannot be in efficient contact with the heat conduction pipe and further improvement in heat exchanger effectiveness between water and the combustion gas in the heat exchanger is interfered.

SUMMARY OF THE INVENTION

The present invention was made to solve the problems above, and one object is to provide a heat exchanger achieving further improvement in heat exchanger effectiveness and another object is to provide a water heater including such a heat exchanger.

A heat exchanger according to the present invention has a plurality of fins and a heat conduction pipe. The plurality of fins each have a main surface and are arranged at a distance from one another in a first direction intersecting the main surface. The heat conduction pipe includes a plurality of through pipes extending along the first direction so as to pass through the plurality of fins and is arranged as one connected pipe. The heat conduction pipe includes a first-stage portion and a second-stage portion. In the first-stage portion, a plurality of first through pipes among the plurality of through pipes are arranged at a first pitch along a second direction intersecting the first direction. In the second-stage portion, a plurality of second through pipes among the plurality of through pipes are arranged at a second pitch along the second direction. The first through pipes and the second through pipes are equal in number. The first pitch and the second pitch are different from each other.

A water heater according to the present invention is a water heater provided with the heat exchanger above, and includes a combustion portion and an exhaust collection and guide member. The combustion portion sends a combustion gas to the heat exchanger. The exhaust collection and guide member is arranged opposite to a side where the combustion portion is arranged with the heat exchanger lying therebetween and has an outlet port through which the combustion gas after heat exchange in the heat exchanger flows out.

According to the heat exchanger in the present invention, in the first-stage portion and the second-stage portion of the heat conduction pipe, the number of first through pipes is the same as the number of second through pipes and a first pitch between the first through pipes and a second pitch between the second through pipes are different from each other, so that a combustion gas can efficiently come in contact with the heat conduction pipe and heat exchanger effectiveness can be improved.

According to the water heater in the present invention, heat exchanger effectiveness is improved because the heat exchanger above is provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 14 is a diagram for illustrating arrangement relation of the heat conduction pipe in the embodiment, with (A) being a diagram showing one form thereof and (B) showing another form.

DESCRIPTION OF THE PREFERRED EMBODIMENTS

Figure 1:
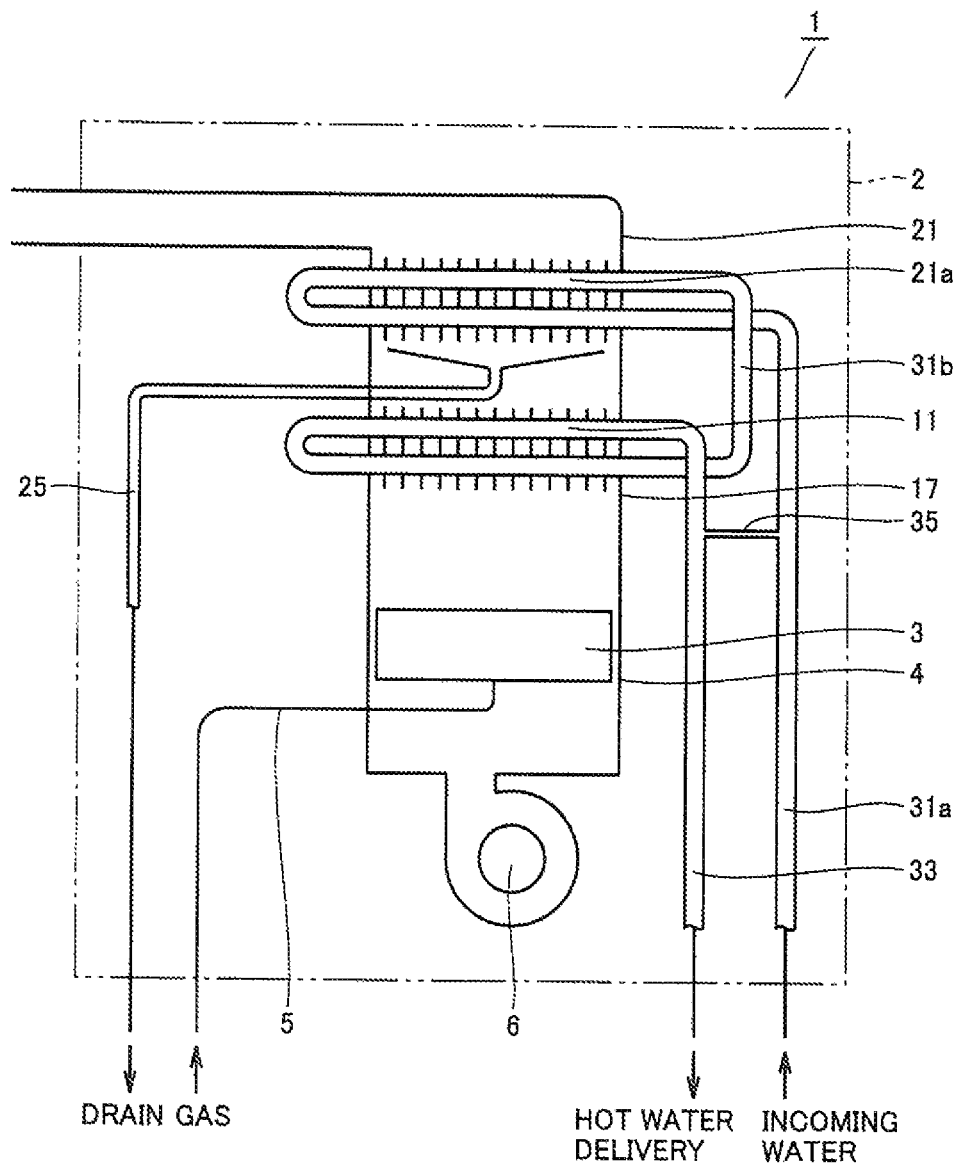
FIG. 1 is a schematic diagram showing a construction of a water heater according to an embodiment of the present invention.

A water heater provided with a heat exchanger according to an embodiment will be described. As shown in FIG. 1, in a housing 2 of a water heater 1, a burner 3 supplying a combustion gas, a combustion fan 6 sending air to burner 3, and a primary heat exchanger 11 and a secondary heat exchanger 21 exchanging heat through the combustion gas are provided. It is noted that the heat exchanger according to the present invention (claims) corresponds to primary heat exchanger 11, but not to secondary heat exchanger 21. A gas pipe 5 is connected to burner 3. A water supply pipe 31a is connected to secondary heat exchanger 21, and a water supply pipe 31b and a hot water delivery pipe 33 which have passed through secondary heat exchanger 21 are connected to primary heat exchanger 11. A bypass pipe 35 is connected between water supply pipe 31b and hot water delivery pipe 33. In addition, a drain pipe 25 discharging drain produced in secondary heat exchanger 21 is provided.

Figure 2:
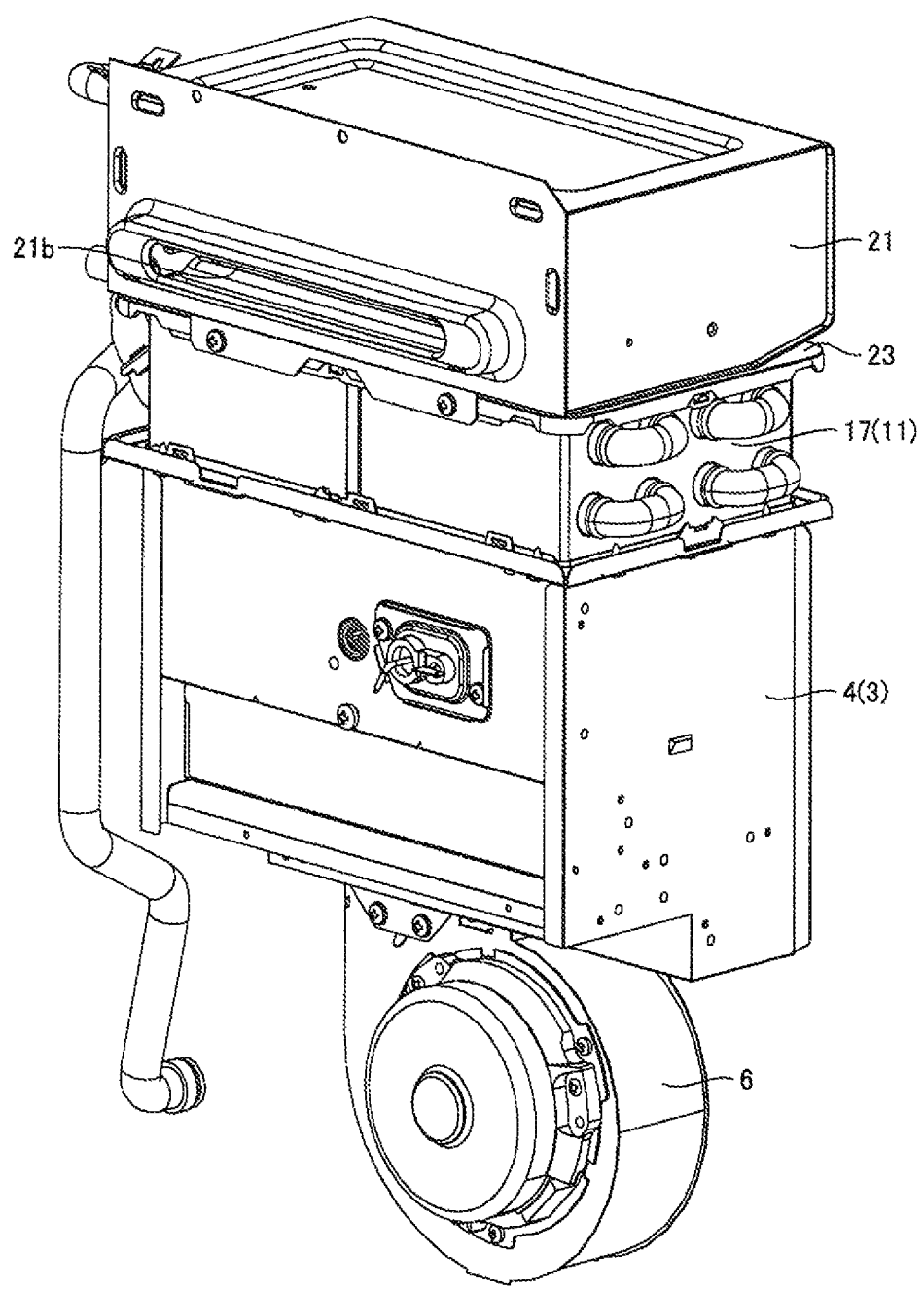
FIG. 2 is a first perspective view showing a burner, a primary heat exchanger, and a secondary heat exchanger in the water heater in the embodiment.
Figure 3:
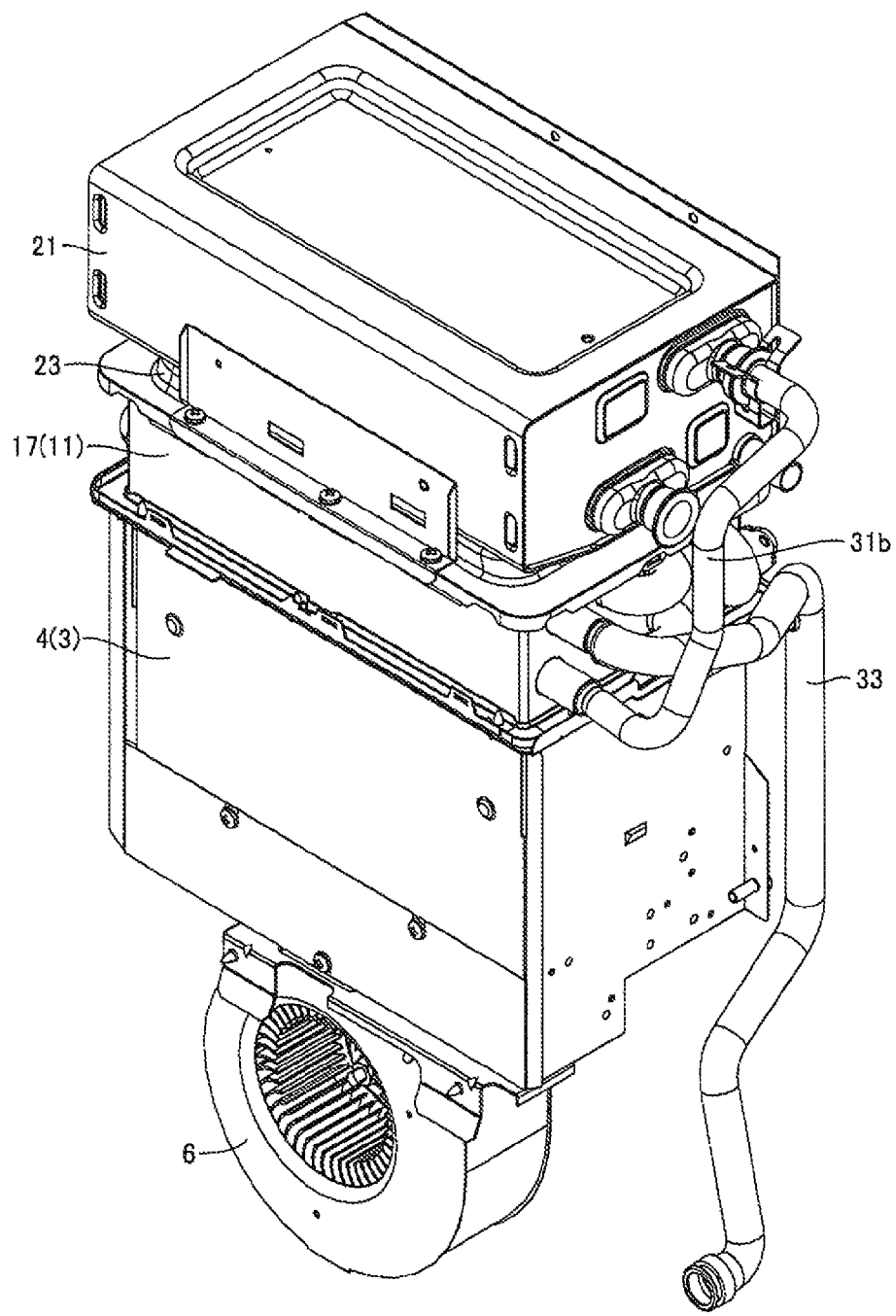
FIG. 3 is a second perspective view showing the burner, the primary heat exchanger, and the secondary heat exchanger in the water heater in the embodiment.
Figure 4:
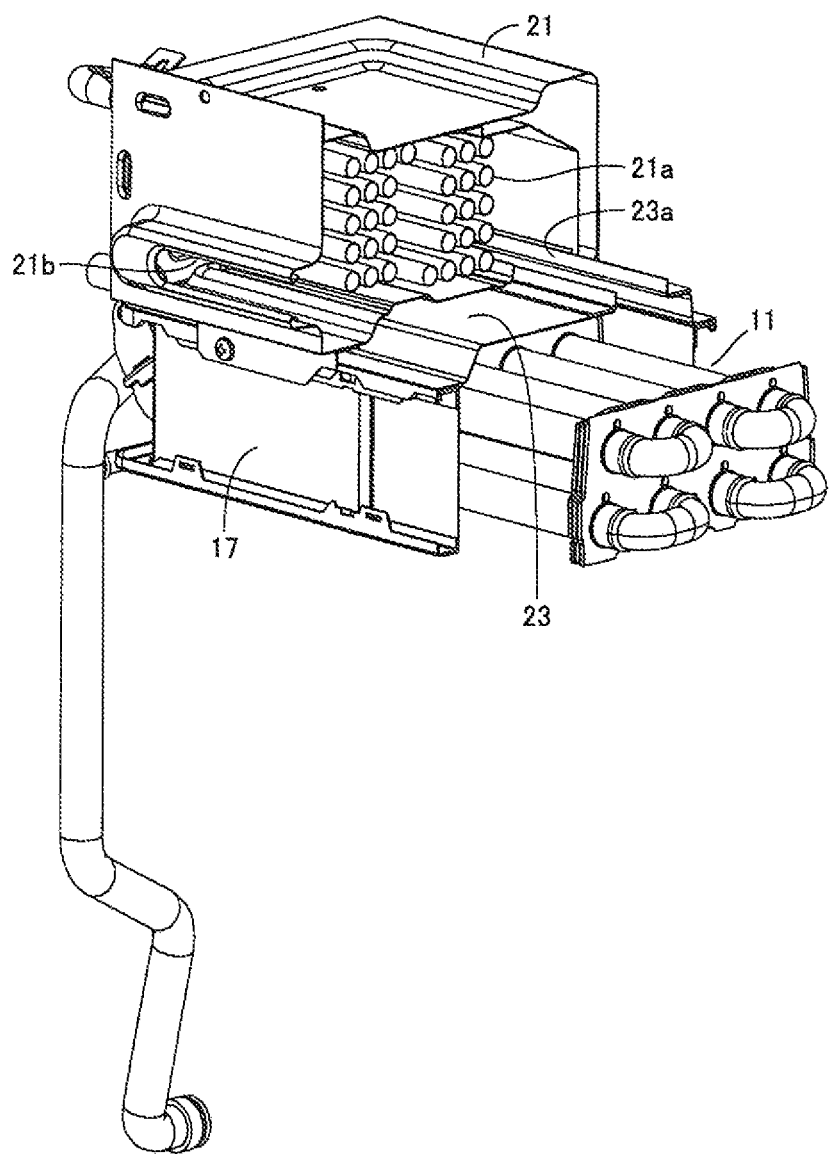
FIG. 4 is a partial cross-sectional perspective view showing a structure of the primary heat exchanger and the secondary heat exchanger in the embodiment.

Primary heat exchanger 11 and a structure around the same will now specifically be described. As shown in FIGS. 2 and 3, burner 3 is accommodated in a burner case 4. Combustion fan 6 is attached to a lower portion of burner case 4. In addition, as shown in FIG. 4, primary heat exchanger 11 is accommodated in a shell plate 17 serving as an accommodation case. An exhaust collection and guide member 23 is arranged above primary heat exchanger 11. In exhaust collection and guide member 23, an outlet port 23a for supplying the combustion gas which passed through primary heat exchanger 11 to secondary heat exchanger 21 is formed. Secondary heat exchanger 21 is provided with a plurality of water pipes 21a and an exhaust port 21b for exhausting the combustion gas.

Figure 5:
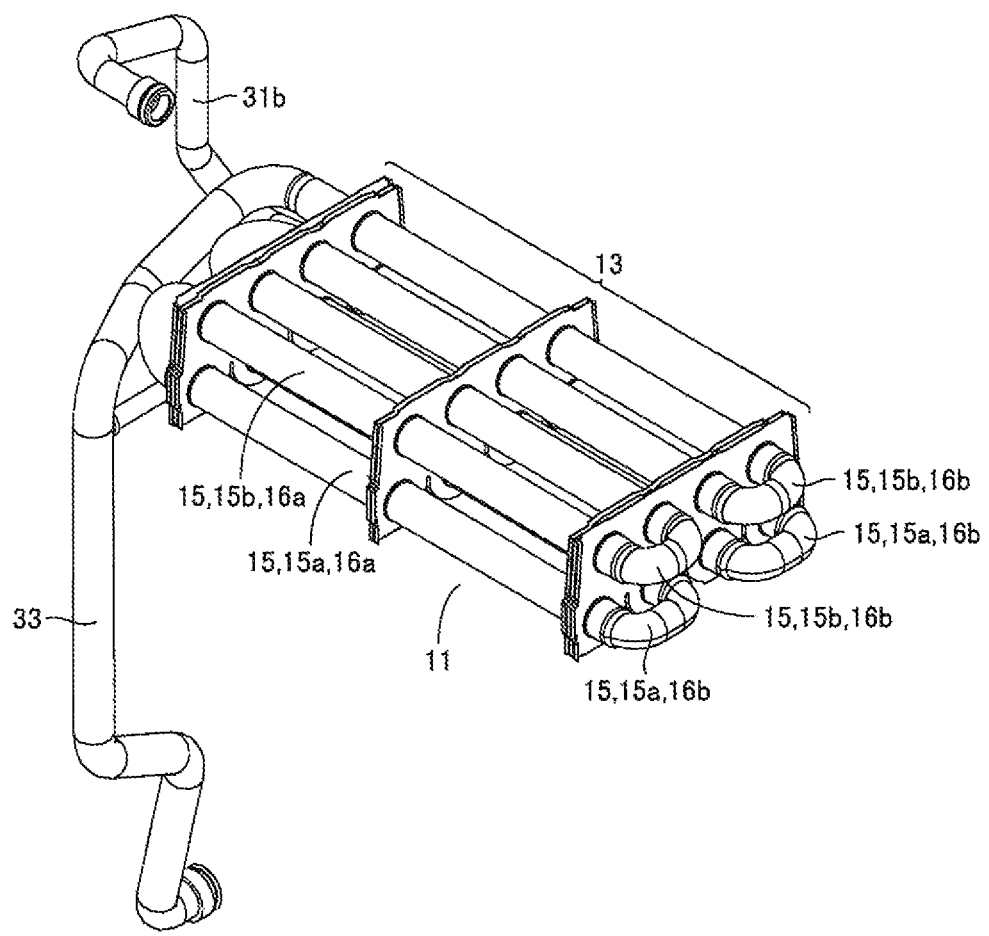
FIG. 5 is a first perspective view showing the structure of the primary heat exchanger in the embodiment.
Figure 6:
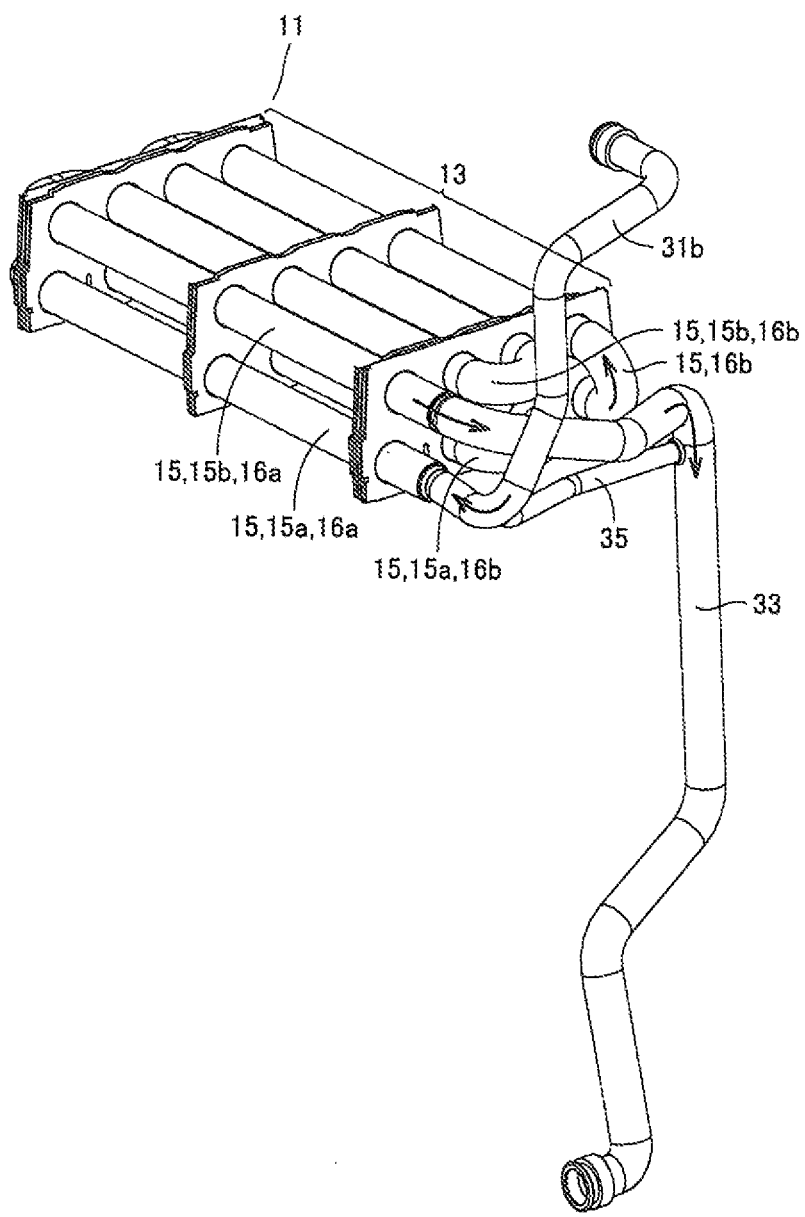
FIG. 6 is a second perspective view showing the structure of the primary heat exchanger in the embodiment.

A structure of primary heat exchanger 11 will now be described in further detail. As shown in FIGS. 5 and 6, in primary heat exchanger 11, a plurality of fins 13 each having a main surface are arranged at a distance from one another in a direction substantially orthogonal to the main surface. It is noted that, in the drawings, for the sake of brevity and convenience of illustration, fins 13 located at opposing ends and around a center are shown. A heat conduction pipe 15 is arranged as one connected pipe, in a lower stage relatively close to burner 3 (see FIGS. 2 and 3) and in an upper stage farther therefrom such that it extends back and forth as it passes through the plurality of fins 13. Heat conduction pipe 15 has a pipe diameter, for example, of 16 mm φ.

Heat conduction pipe 15 is formed by a straight pipe 16a serving as a through pipe extending to pass through the plurality of fins 13 and a U-shaped pipe 16b connecting adjacent straight pipes 16a to each other. Water supply pipe 31b is connected to one end side of heat conduction pipe 15 and hot water delivery pipe 33 is connected to the other end side such that water flows from a heat conduction pipe 15a in the lower stage to a heat conduction pipe 15b in the upper stage (see an arrow in FIG. 6).

Figure 7:
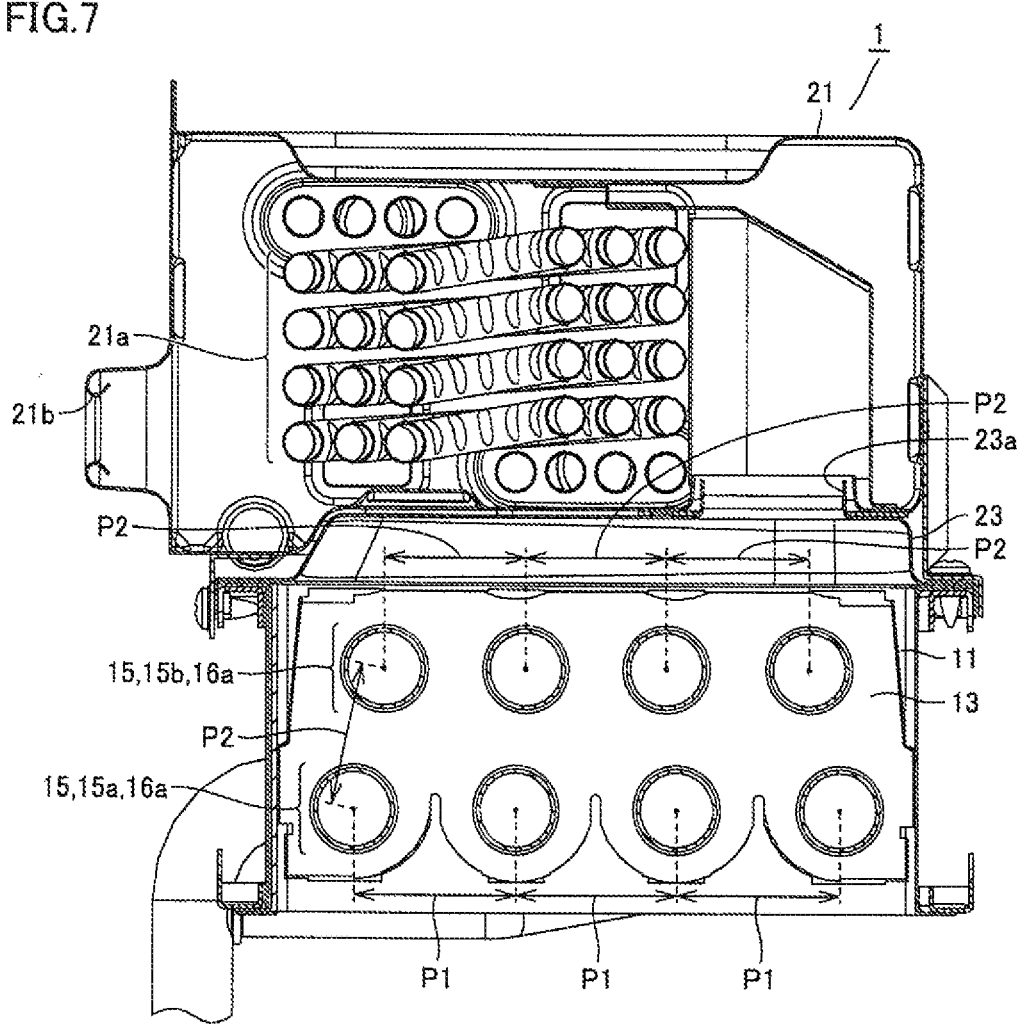
FIG. 7 is a cross-sectional view in a direction orthogonal to a direction in which a heat conduction pipe extends, in the primary heat exchanger in the embodiment.

An arrangement structure of heat conduction pipe 15 will now be described. As shown in FIG. 7, in heat conduction pipe 15a in the lower stage, straight pipes 16a are arranged at a first pitch P1 along a direction substantially orthogonal (a second direction) to a direction of extension thereof (a first direction). In heat conduction pipe 15b in the upper stage, straight pipes 16a are arranged at a second pitch P2 shorter than first pitch P1 along the second direction. The number of straight pipes 16a (heat conduction pipes 15a) in the lower stage is the same as the number of straight pipes 16a (heat conduction pipes 15b) in the upper stage. In addition, a pitch between heat conduction pipe 15a (straight pipe 16a) in the lower stage and heat conduction pipe 15b (straight pipe 16a) in the upper stage which are located at one end among heat conduction pipes 15a in the lower stage and heat conduction pipes 15b in the upper stage arranged along the second direction is set to second pitch P2. First pitch P1 is set, for example, to 32 mm, and second pitch P2 is set, for example, to 28 mm.

A position of a center (a cross-section) of each of heat conduction pipes 15b (straight pipes 16a) in the upper stage in the second direction and a position of a center (a cross-section) of each of heat conduction pipes 15a (straight pipes 16a) in the lower stage in the second direction are displaced from each other. Heat conduction pipe 15a in the lower stage is arranged such that cross-sections of heat conduction pipes 15a along the second direction are line-symmetric with respect to a perpendicular bisector S of a line segment connecting the center of heat conduction pipe 15a (straight pipe 16a) located at one end and the center of heat conduction pipe 15a (straight pipe 16a) located at the other end, of heat conduction pipes 15a (straight pipes 16a) arranged along the second direction. In addition, heat conduction pipes 15b in the upper stage are also arranged such that the cross-sections of heat conduction pipes 15b along the second direction are line-symmetric with respect to that perpendicular bisector S (see FIG. 11). Primary heat exchanger 11 of the present water heater 1 is constructed as described above.

An operation of the water heater described above will now be described. By turning on an operation switch and allowing a prescribed amount of water to flow through water supply pipe 31a, combustion fan 6 starts to rotate, burner 3 is ignited (see FIG. 2 or 3), and a combustion gas is sent upward from burner 3. The sent combustion gas flows in the inside of shell plate 17 where primary heat exchanger 11 is arranged, then flows through secondary heat exchanger 21 through an outlet port 23a of exhaust collection and guide member 23, and is thereafter exhausted through exhaust port 21b to the outside.

On the other hand, water fed through water supply pipe 31a initially flows through water pipe 21a in secondary heat exchanger 21. While water flows through secondary heat exchanger 21, it is preheated by the combustion gas (latent heat). Then, preheated water is sent through water supply pipe 31b to primary heat exchanger 11. Preheated water sent to primary heat exchanger 11 flows through heat conduction pipes 15a in the lower stage and then flows through heat conduction pipes 15b in the upper stage. While water flows through that heat conduction pipe 15, heat is exchanged between water and the combustion gas (sensible heat) which flows through a gap between fin 13 and fin 13, so that preheated water is heated to a prescribed temperature. Hot water heated to a prescribed temperature is sent to the outside of water heater 1 through hot water delivery pipe 33. Thus, water heater 1 can supply hot water at a prescribed temperature.

A function and effect of the water heater provided with the heat exchanger described above will be described in comparison with the case of a water heater according to a comparative example.

Figure 8:
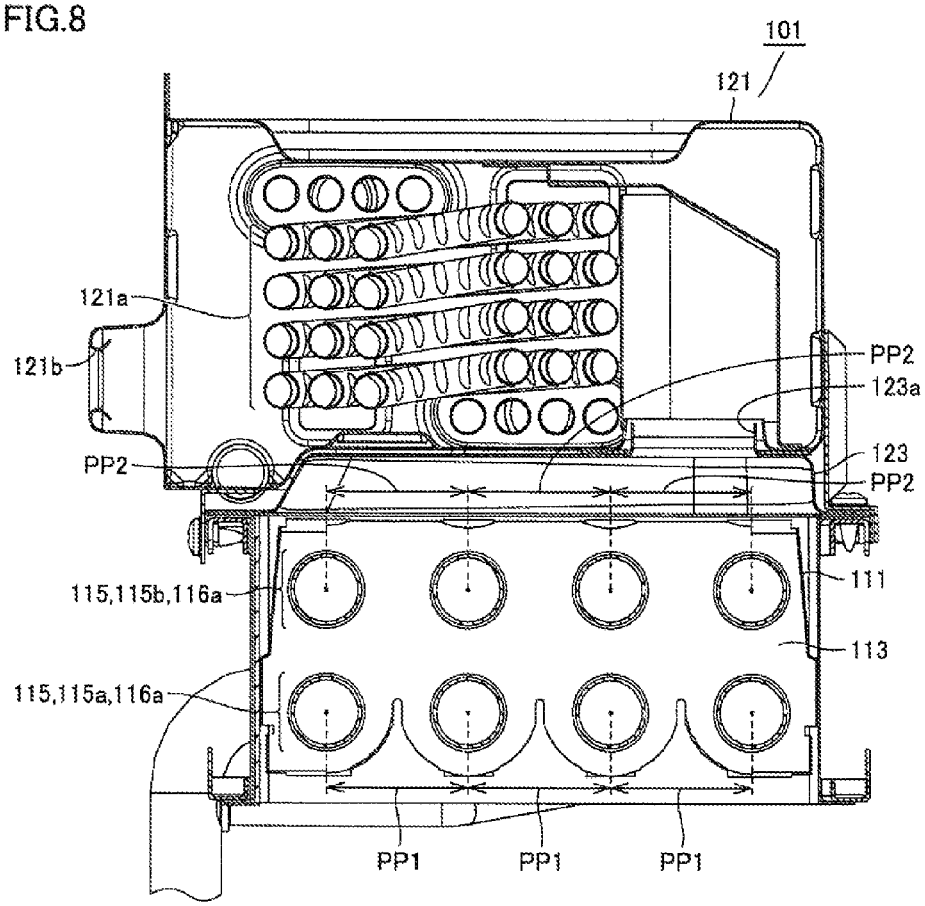
FIG. 8 is a cross-sectional view in a direction orthogonal to a direction in which a heat conduction pipe extends, in a primary heat exchanger of a water heater according to a comparative example.

As shown in FIG. 8, in a heat conduction pipe 115 in a primary heat exchanger 111 in a water heater 101 according to the comparative example, the number of straight pipes 116a (heat conduction pipes 115a) in a lower stage is the same as the number of straight pipes 116a (heat conduction pipes 115b) in an upper stage. Heat conduction pipes 115a (straight pipes 116a) in the lower stage are arranged at a pitch PP1 along a direction substantially orthogonal (a second direction) to a direction of extension thereof (a first direction). Heat conduction pipes 115b (straight pipes 116a) in the upper stage are arranged at a pitch PP2 along the second direction. Pitch PP1 is the same as pitch PP2.

In addition, a position of a center (a cross-section) of each of heat conduction pipes 115b (straight pipes 116a) in the upper stage in the second direction is the same as a position of a center (a cross-section) of each of heat conduction pipes 115a (straight pipes 116a) in the lower stage in the second direction. Since features of the water heater are otherwise the same as those in the water heater shown in FIG. 2 and the like, description thereof will not be repeated unless it is necessary.

An operation of water heater 101 according to the comparative example will now be described. The combustion gas sent upward from a burner 103 flows in the inside of a shell plate 117 where primary heat exchanger 111 is arranged, thereafter flows through an exhaust collection and guide member 123 and a secondary heat exchanger 121, and then is exhausted to the outside. On the other hand, water preheated by secondary heat exchanger 121 and sent to primary heat exchanger 111 is heated to a prescribed temperature by the combustion gas while it flows through heat conduction pipe 115. Here, heat is exchanged between the combustion gas which flows through a gap between a fin 113 and fin 113 and water which flows through heat conduction pipe 115 passing through fins 113.

Figure 9:
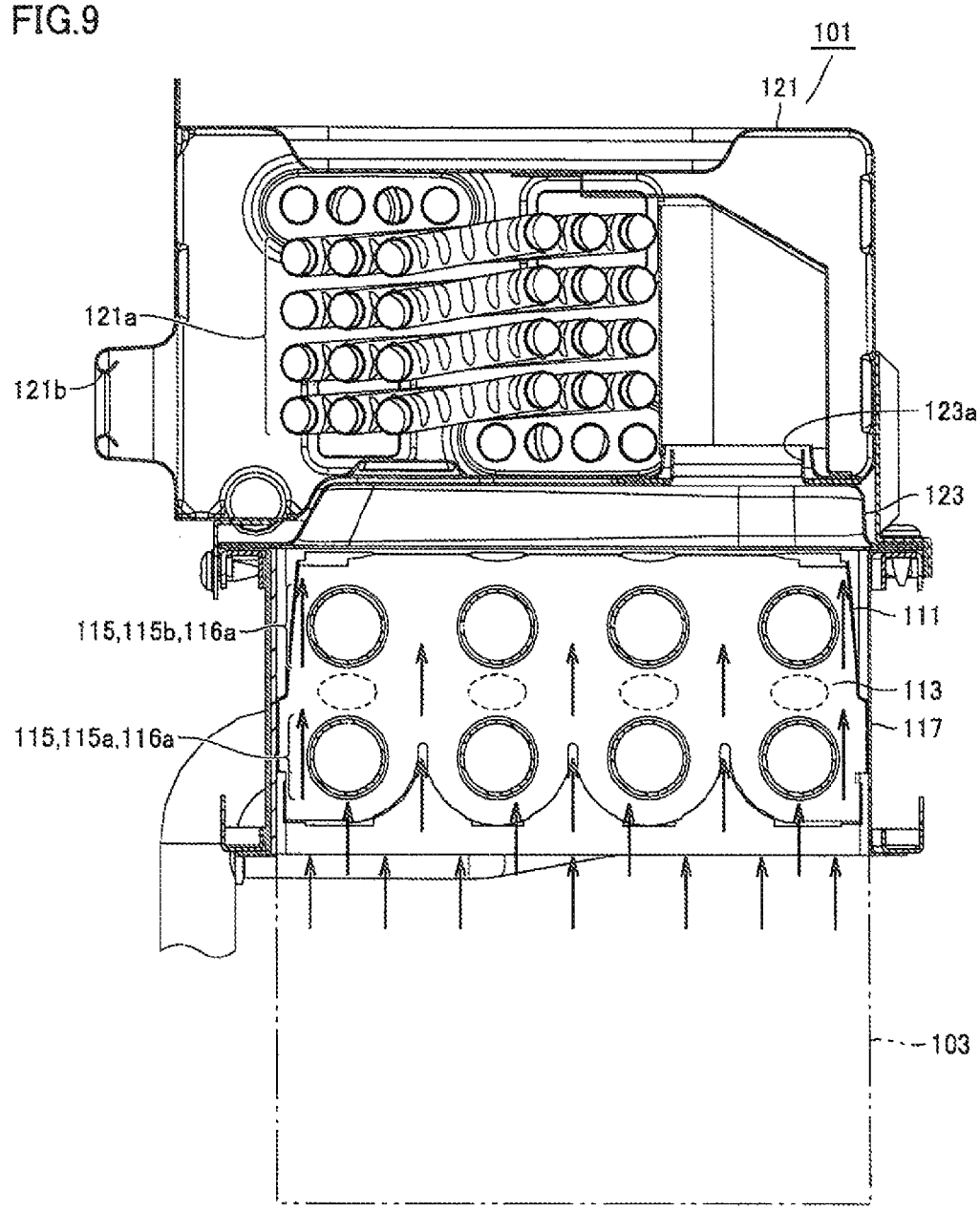
FIG. 9 is a diagram showing a flow of a combustion gas in the primary heat exchanger in the water heater according to the comparative example.

As shown in FIG. 9, in water heater 101 according to the comparative example, heat conduction pipe 115 is arranged such that a pitch between heat conduction pipes 115a in the lower stage is the same as a pitch between heat conduction pipes 115b in the upper stage. In addition, heat conduction pipe 115 is arranged such that a position of the center of each of heat conduction pipes 115b in the upper stage in the second direction is the same as a position of the center of each of heat conduction pipes 115a in the lower stage in the second direction. Therefore, heat conduction pipe 115b in the upper stage on a downstream side is located directly above a portion hidden behind heat conduction pipe 115a in the lower stage on an upstream side (see a dotted frame), with respect to the flow of the combustion gas (see the arrow). Consequently, it becomes difficult to bring the combustion gas in efficient contact with heat conduction pipes 115b in the upper stage, which interferes improvement in heat exchanger effectiveness of primary heat exchanger 111.

Figure 10:
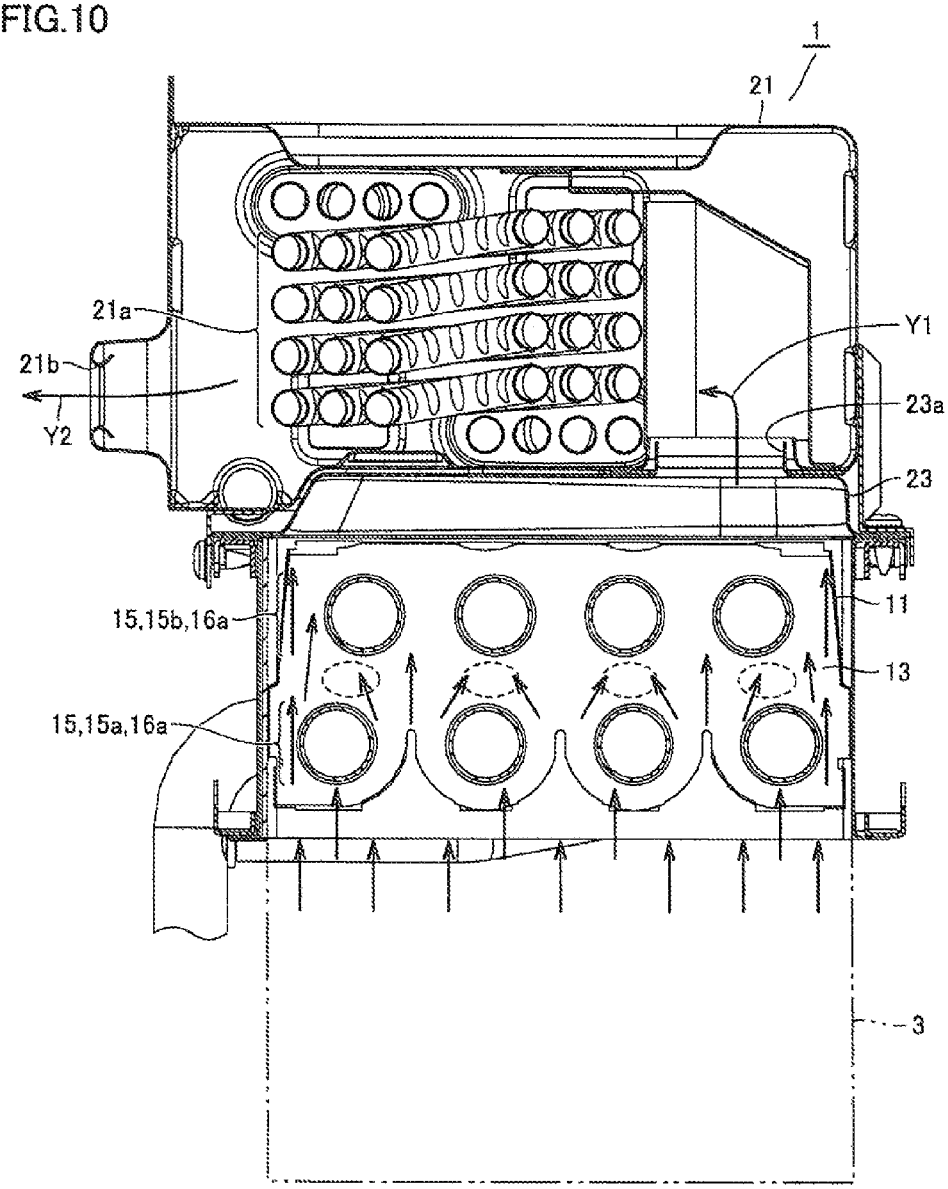
FIG. 10 is a diagram showing a flow of a combustion gas in the primary heat exchanger in the embodiment.

In contrast to the comparative example, in water heater 1 according to the embodiment, as shown in FIGS. 7 and 10, heat conduction pipe 15 is arranged such that pitch P2 between heat conduction pipes 15b in the upper stage is shorter than pitch P1 between heat conduction pipes 15a in the lower stage (arrangement A). In addition, heat conduction pipe 15 is arranged such that a position of the center of each of heat conduction pipes 15b in the upper stage in the second direction and a position of the center of each of heat conduction pipes 15a in the lower stage in the second direction are displaced from each other (arrangement B). Therefore, heat conduction pipe 15b in the upper stage on the downstream side is displaced in the second direction from a portion hidden behind heat conduction pipe 15a in the lower stage on the upstream side (see a dotted frame), with respect to the flow of the combustion gas (see the arrow). Thus, the combustion gas can efficiently be brought in contact with heat conduction pipes 15b in the upper stage, so that heat exchanger effectiveness of primary heat exchanger 11 can be enhanced.

In particular, in a case where an interval between the heat conduction pipe in the lower stage and the heat conduction pipe in the upper stage in the primary heat exchanger is made smaller in order to reduce a size of the water heater (make the water heater compact), in the water heater according to the comparative example, it becomes more difficult to efficiently bring the combustion gas in contact with the heat conduction pipes in the upper stage. In contrast, in water heater 1 according to the embodiment, even when an interval between heat conduction pipe 15a in the lower stage and heat conduction pipe 15b in the upper stage in primary heat exchanger 11 is decreased, the combustion gas can efficiently be brought in contact with heat conduction pipes 15b in the upper stage, because heat conduction pipes 15a in the lower stage and heat conduction pipes 15b in the upper stage are arranged in arrangement A and arrangement B. Thus, lowering in heat exchanger effectiveness of primary heat exchanger 11 can be prevented and contribution to reduction in size of primary heat exchanger 11 and hence reduction in size of water heater 1 can be made.

Figure 11:
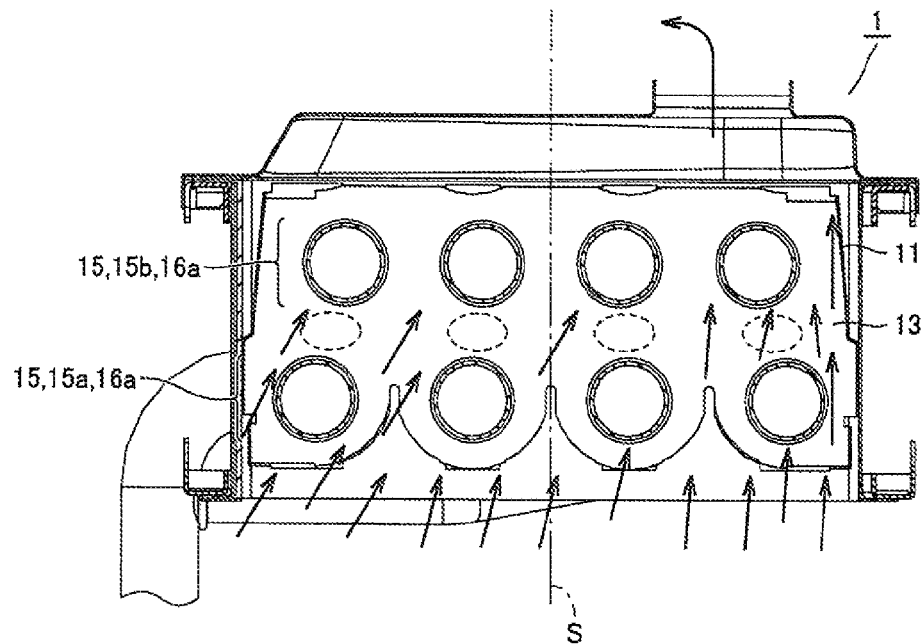
FIG. 11 is a diagram showing arrangement relation of the heat conduction pipe in the primary heat exchanger and a flow of the combustion gas in the embodiment.
Figure 12:
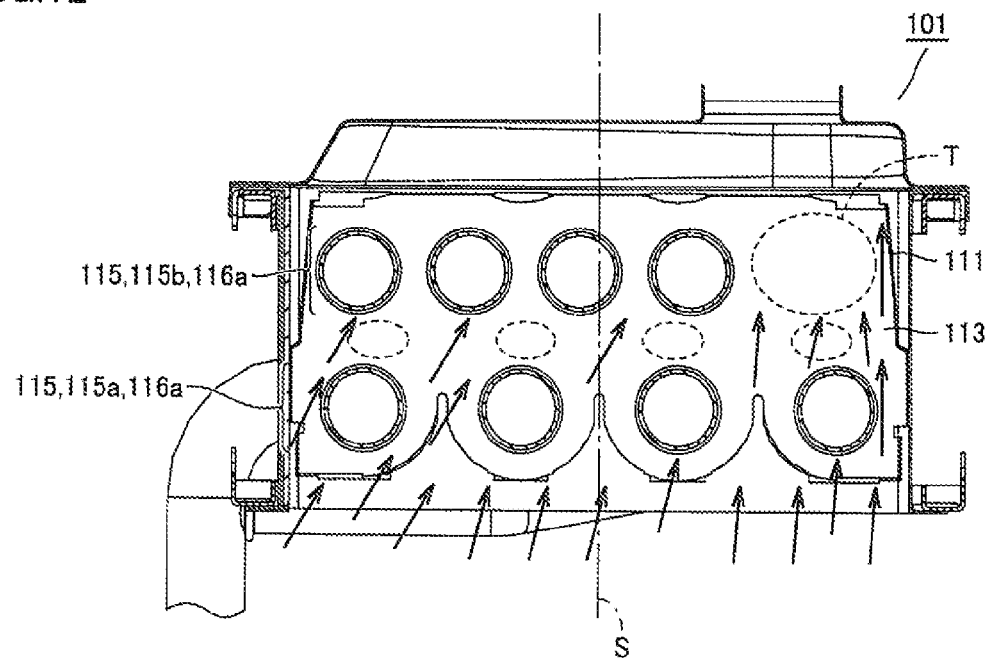
FIG. 12 is a diagram showing arrangement relation of the heat conduction pipe in the primary heat exchanger and a flow of the combustion gas in the water heater according to the comparative example.

In addition, as shown in FIG. 11, in primary heat exchanger 11 of the water heater according to the embodiment, with regard to heat conduction pipes 15a in the lower stage and heat conduction pipes 15b in the upper stage, heat conduction pipe 15 (a cross-section) is arranged to be line-symmetric with respect to perpendicular bisector S. Therefore, even when outlet port 23a for the combustion gas provided in exhaust collection and guide member 23 is located on a side of heat conduction pipe 15a located at one end (a rear side) of heat conduction pipes 15a arranged along the second direction, the combustion gas can substantially evenly be in contact with heat conduction pipe 15 and heat can efficiently be exchanged. In contrast, as shown in FIG. 12, when heat conduction pipes 115b in the upper stage are arranged as concentrated on a side of heat conduction pipe 115a located at the other end (a front side) of heat conduction pipes 115a arranged along the second direction, the combustion gas flows through a region (see a dotted frame T) not contributing to heat exchange because no heat conduction pipe is arranged, and heat exchanger effectiveness is lowered.

Moreover, in primary heat exchanger 11 of the water heater according to the embodiment, the second pitch between heat conduction pipes 15b in the upper stage is shorter than the first pitch between heat conduction pipes 15a in the lower stage, and heat conduction pipes 15a in the lower stage and heat conduction pipes 15b in the upper stage are arranged to be line-symmetric with respect to perpendicular bisector S, so that stagnation of the combustion gas can be suppressed. Namely, a distance between shell plate 17 and heat conduction pipe 15b located at one end among heat conduction pipes 15b in the upper stage arranged along the second direction is greater than a distance between shell plate 17 and corresponding heat conduction pipe 15a in the lower stage, and in particular in a region on a side where outlet port 23a of exhaust collection and guide member 23 is not arranged, on the downstream side of the flow of the combustion gas, stagnation of the combustion gas can be suppressed.

Figure 13:
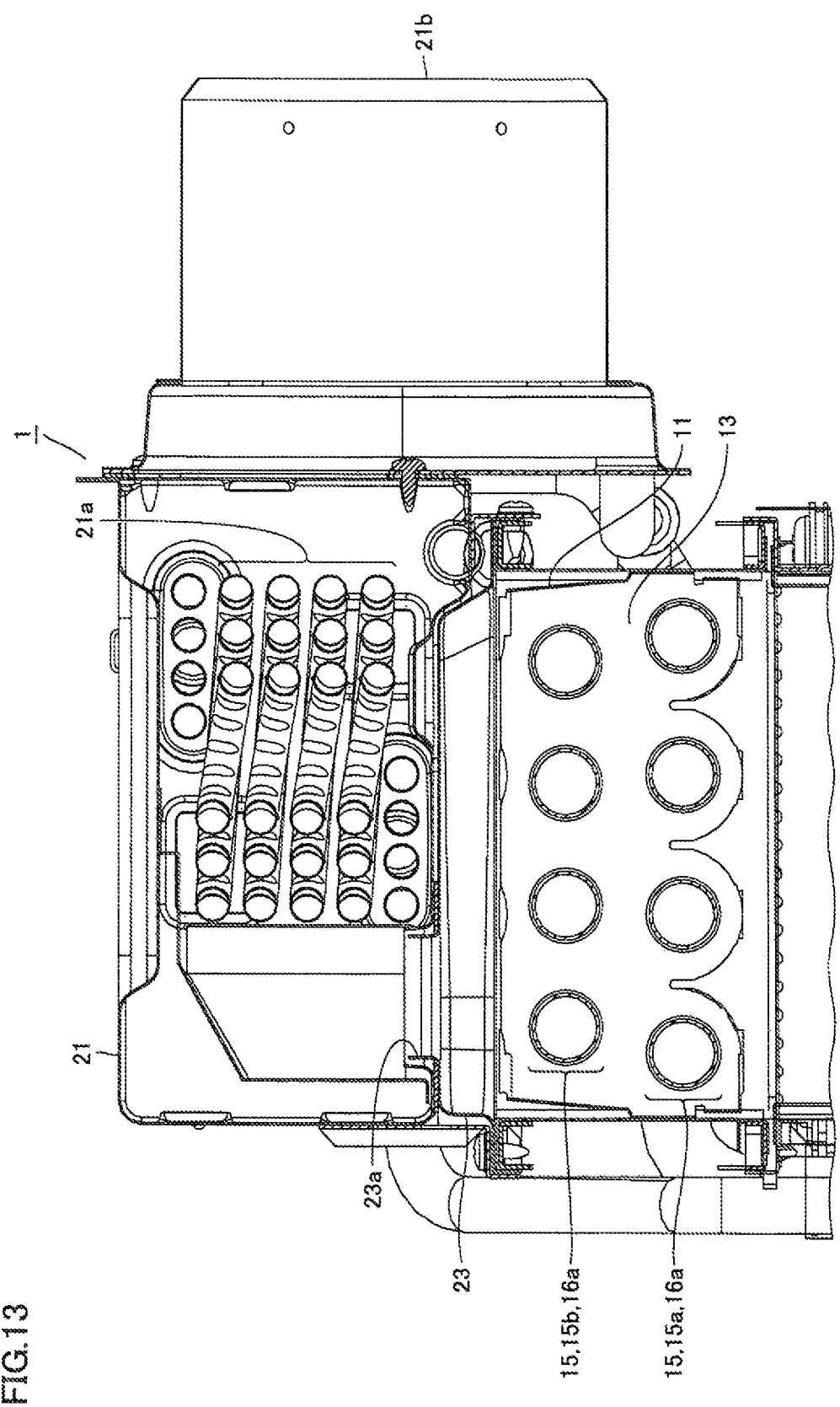
FIG. 13 is a cross-sectional view showing a primary heat exchanger and a secondary heat exchanger in a water heater according to one variation in the embodiment.

Furthermore, in primary heat exchanger 11 of the water heater according to the embodiment, heat conduction pipes 15 are arranged to be line-symmetric with respect to perpendicular bisector S, so that the exhaust collection and guide member can be attached in an orientation opposite to an orientation (arrangement relation) of exhaust collection and guide member 23 shown in FIG. 7 and the like, without change in primary heat exchanger 11. Namely, as shown in FIG. 13, exhaust collection and guide member 23 can be attached such that outlet port 23a for the combustion gas is located on the front side opposite to the rear side and exhaust port 21b is located on the rear side. In such water heater 1 as well, owing to symmetry of arrangement of heat conduction pipe 15, the combustion gas can substantially evenly be in contact with heat conduction pipe 15 and heat can efficiently be exchanged. In addition, in order to address variation in exhaust from water heater 1, primary heat exchanger 11 can be shared, which contributes to reduction in cost.

Thus, in the primary heat exchanger according to the embodiment, it has been described that heat conduction pipe 15 is arranged such that a position of heat conduction pipe 15b in the upper stage in the second direction and a position of heat conduction pipe 15a in the lower stage in the second direction are displaced from each other. Here, an amount of displacement will be discussed.

A heat exchanger in which heat conduction pipes are arranged in a plurality of stages is assumed. On the premise that the heat conduction pipes are arranged to be line-symmetric with respect to a perpendicular bisector, it is assumed that a pitch between the heat conduction pipes in a lowermost stage is defined as a, a pitch between the heat conduction pipes in a stage directly above the lowermost stage is defined as b, and the number of heat conduction pipes in each stage is the same. Then, the total number of heat conduction pipes in each stage is defined as 2(n+1). Here, n represents an integer (0, 1, 2, 3, . . . ).

As a result of studies conducted by the inventors with a pipe diameter of the heat conduction pipe being set, for example, to 16 mm φ, it was found that relation shown below should be satisfied in arrangement of the heat conduction pipes in a case where n is an odd number (for example, 3) shown in FIG. 14(A).

$a/2 > a/2 - b/2 > 1$ mm

In addition, it was found that relation shown below should be satisfied in arrangement of the heat conduction pipes in a case where n is an even number (for example, 2) shown in FIG. 14(B).

$a/2 \geq a - b > 1$ mm

Therefore, it was found that a desired effect was obtained if an amount of displacement D (a length in the second direction) between a center C1 of the heat conduction pipe in the lowermost stage and a center C2 of the heat conduction pipe directly above the lowermost stage is 1 mm or greater.

In addition, in primary heat exchanger 11 according to the embodiment, by setting the number of heat conduction pipes 15a in the lower stage to be equal to the number of heat conduction pipes 15b in the upper stage, both of one end of heat conduction pipe 15 to which water supply pipe 31b is connected and the other end of heat conduction pipe 15 to which hot water delivery pipe 33 is connected can be arranged on one side of heat conduction pipe 15 (straight pipe 16a) extending in the first direction, as shown in FIG. 6. Thus, as shown in FIG. 3, water supply pipe 31b and hot water delivery pipe 33 should only be attached to one side portion of a side where one end and the other end of the heat conduction pipe are located, in shell plate 17 surrounding the primary heat exchanger. Consequently, a length of bypass pipe 35 connecting water supply pipe 31b and hot water delivery pipe 33 to each other can be shortened and reduction in cost can be achieved. It is noted that bypass pipe 35 is a pipe for mixing fed water with water (hot water) heated by the heat exchanger without heating the fed water, in order to supply hot water at a desired hot water temperature.

Figure 15:
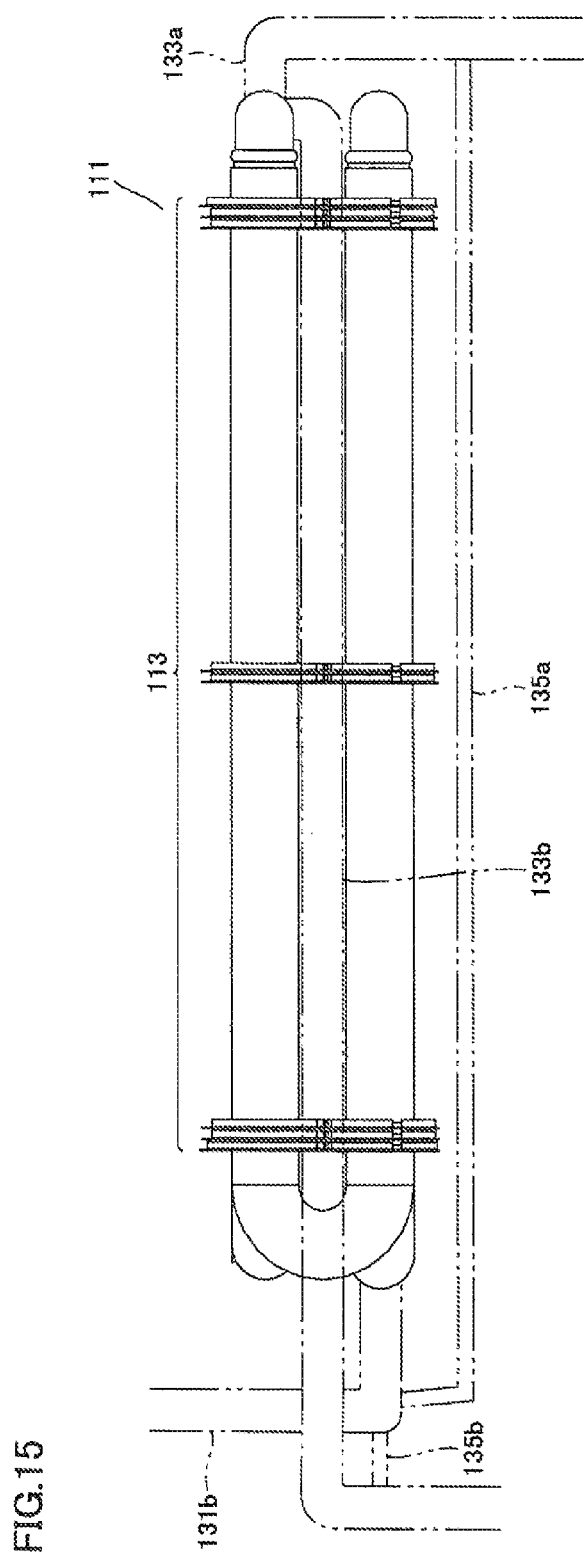
FIG. 15 is a side view showing the primary heat exchanger in the water heater according to the comparative example.

In contrast, in the case where the number of heat conduction pipes in the lower stage is different from the number of heat conduction pipes in the upper stage, one end of the heat conduction pipe to which the water supply pipe is connected and the other end of the heat conduction pipe to which the hot water delivery pipe is connected are located to be opposed to each other, across one side and the other side of the heat conduction pipe (straight pipe) extending in the first direction. Therefore, as shown in FIG. 15, a length of a bypass pipe 135a connecting a water supply pipe 131b and a hot water delivery pipe 133a to each other increases. Alternatively, in order to avoid increase in length of a bypass pipe, a hot water delivery pipe 133b should extend along shell plate 17 as far as a side where water supply pipe 131b is arranged. Thus, even though bypass pipe 135b can be made shorter, a length of hot water delivery pipe 133b becomes longer. When hot water delivery pipe 133b extends along shell plate 17, hot water delivery pipe 133b cannot exchange heat directly with the combustion gas, and hence it is more disadvantageous in terms of improvement in heat exchanger effectiveness than the primary heat exchanger according to the embodiment.

In addition, by setting a pitch between heat conduction pipe 15a in the lower stage and heat conduction pipe 15b in the upper stage located at one end among heat conduction pipes 15a in the lower stage and heat conduction pipes 15b in the upper stage arranged along the second direction to second pitch P2, a connection pipe connecting heat conduction pipes 15b in the upper stage to each other can be shared as a connection pipe connecting heat conduction pipe 15a in the lower stage and heat conduction pipe 15b in the upper stage to each other, which can contribute to reduction in cost.

Moreover, in this case, as compared with a case where a pitch between heat conduction pipe 15a in the lower stage and heat conduction pipe 15b in the upper stage located at one end to first pitch P1, a size in a vertical direction of primary heat exchanger 11 can be reduced, which also contributes to more compact primary heat exchanger 11.

Figure 16:
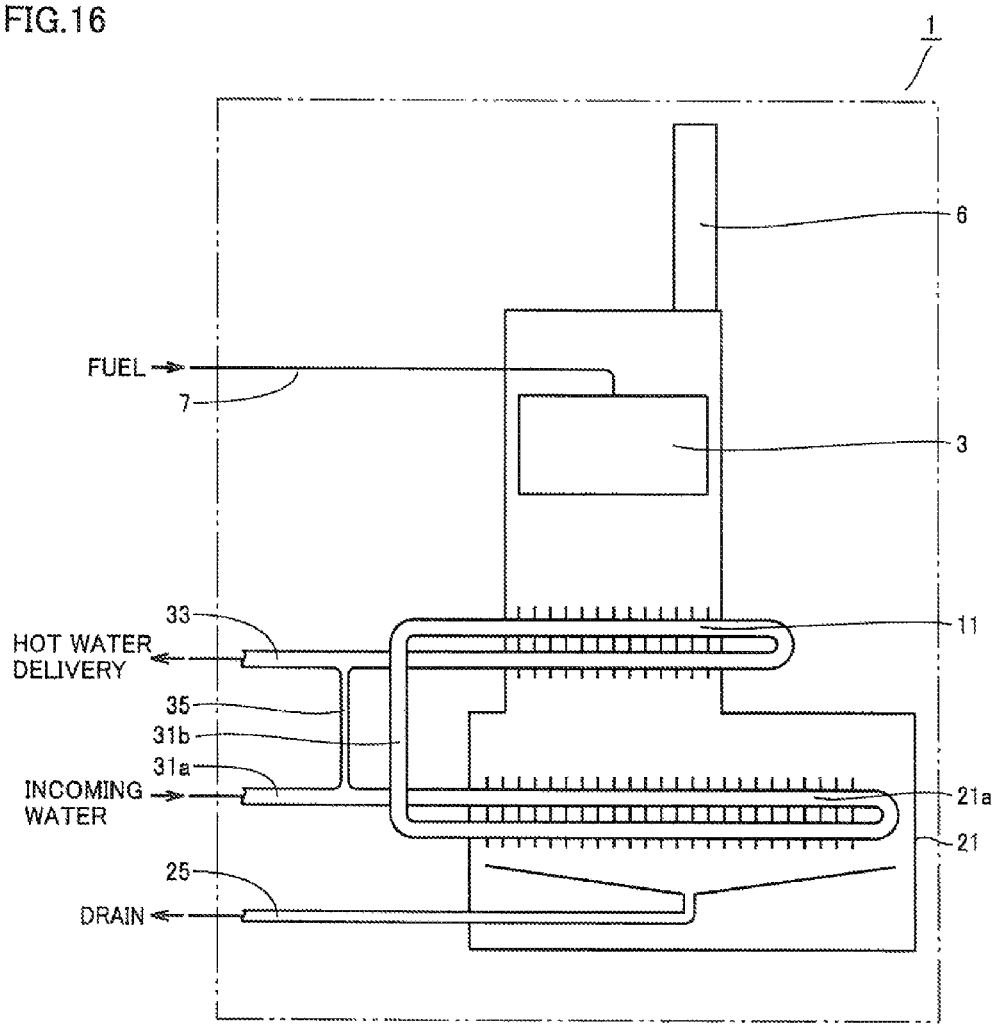
FIG. 16 is a schematic diagram showing a construction of a water heater according to another variation in the embodiment.

The heat exchanger described above has been described by way of example of a case where it is applied as the primary heat exchanger of the water heater where the heat exchanger is arranged above the burner (see FIG. 1). The water heater to which the heat exchanger is applied is not limited to this type, and as shown in FIG. 16, it can also be applied as primary heat exchanger 11 of the water heater in which the heat exchanger is arranged below burner 3. In this case, secondary heat exchanger 21 is arranged below primary heat exchanger 11. A combustion system of this type is applied to a water heater mainly using petroleum as fuel. Therefore, a fuel pipe 7 is connected to burner 3.

The heat exchanger described above has been described by way of example of arrangement in two stages of a lower stage and an upper stage as arrangement of a heat conduction pipe, however, arrangement in three or more stages may be applicable. As described above, in particular a case of arrangement in two stages can contribute to a more compact primary heat exchanger. A numeric value exemplified as a pipe diameter of and a pitch between heat conduction pipes is by way of example, and limitation thereto is not intended.

The present invention is effectively made use of in a heat exchanger provided with a heat conduction pipe passing through a plurality of fins.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A water heater provided with a heat exchanger, the heat exchanger including:
   a plurality of fins each having a main surface and arranged at a distance from one another in a first direction intersecting said main surface; and
   a heat conduction pipe including a plurality of through pipes extending along said first direction so as to pass through said plurality of fins and arranged as one connected pipe,
   said heat conduction pipe including
      a first-stage portion where a plurality of first through pipes among said plurality of through pipes are arranged at a first pitch along a second direction intersecting said first direction, and
      a second-stage portion where a plurality of second through pipes among said plurality of through pipes are arranged at a second pitch along said second direction,
   said first through pipes and said second through pipes being equal in number from one end to the other end of each fin in the second direction,
   said plurality of first through pipes and said plurality of second through pipes being arranged as a part of said one connected pipe, and
   said plurality of first through pipes and said plurality of second through pipes passing through each of the plurality of fins as a single continuous through pipe, the water heater comprising:
   a combustion portion sending a combustion gas to said heat exchanger; and
   an exhaust collection and guide member arranged opposite to a side where said combustion portion is arranged with said heat exchanger lying therebetween and having an outlet port through which the combustion gas after heat exchange in said heat exchanger flows out,
   wherein
   said heat exchanger is arranged either above or below said combustion portion,
   said first-stage portion is located on a side relatively closer than the second-stage portion to said combustion portion,
   said second-stage portion is located on a side relatively farther than the first-stage portion from said combustion portion,
   said second pitch in said second-stage portion is set to be shorter than said first pitch in said first-stage portion,
   when viewed in the first direction, the first-stage portion and the second-stage portion are adjacent to and spaced from each other in a direction perpendicular to the first and second directions to form an intermediate area therebetween on each fin, the intermediate area being free from any through pipe passing through the plurality of fins along entire extents from the one end to the other end of each fin in the second direction, and
   the first pitch is a distance between centers of adjacent ones of the plurality of first through pipes in the second direction and the second pitch is a distance between centers of adjacent ones of the plurality of second through pipes in the second direction.

2. The water heater according to claim 1, wherein
   said plurality of first through pipes are arranged such that cross-sections of said plurality of first through pipes along said second direction are line-symmetric, when viewed in the first direction, with respect to a perpendicular bisector of a line segment connecting a center of a first through pipe located at one end in the second direction and a center of a first through pipe located at the other end in the second direction among said plurality of first through pipes arranged along said second direction, and
   said plurality of second through pipes are arranged such that cross-sections of said plurality of said second through pipes along said second direction are line-symmetric, when viewed in the first direction, with respect to said perpendicular bisector, and
   when viewed in the first direction, a position of the center of each of said plurality of second through pipes in said second direction and a position of the center of each of said plurality of first through pipes in said second direction are displaced from each other in said second direction.

3. The water heater according to claim 2, wherein
   a pitch between the first through pipe located at said one end in the second direction among said plurality of first through pipes arranged along said second direction and a second through pipe located at said one end in the second direction among said plurality of second through pipes arranged along said second direction is set to a shorter pitch of said first pitch and said second pitch.

4. The water heater according to claim 2, wherein
   said outlet port is provided on any of a side of the first through pipe located at one end in the second direction and a side of the first through pipe located at the other end in the second direction, among said plurality of first through pipes arranged along said second direction, on a side opposite to the side where said combustion portion is arranged with said heat exchanger lying therebetween.

5. The water heater according to claim 2, comprising:
a shell plate arranged to surround said plurality of fins and including a pair of opposing side portions opposed to each other at a distance in said first direction; and
a water supply pipe and a hot water delivery pipe, wherein both of one end and the other end of said heat conduction pipe are located on a side where one opposing side portion of said pair of opposing side portions is located,
said water supply pipe is connected to said one end of said heat conduction pipe from the side of said one opposing side portion, and said hot water delivery pipe is connected to the other end of said heat conduction pipe from the side of said one opposing side portion.

6. The water heater according to claim 1, wherein
a pitch between a first through pipe located at one end in the second direction among said plurality of first through pipes arranged along said second direction and a second through pipe located at said one end in the second direction among said plurality of second through pipes arranged along said second direction is set to a shorter pitch of said first pitch and said second pitch.

7. The water heater according to claim 6, wherein
said outlet port is provided on any of a side of the first through pipe located at one end in the second direction and a side of the first through pipe located at the other end in the second direction, among said plurality of first through pipes arranged along said second direction, on a side opposite to the side where said combustion portion is arranged with said heat exchanger lying therebetween.

8. The water heater according to claim 6, comprising:
a shell plate arranged to surround said plurality of fins and including a pair of opposing side portions opposed to each other at a distance in said first direction; and
a water supply pipe and a hot water delivery pipe, wherein both of one end and the other end of said heat conduction pipe are located on a side where one opposing side portion of said pair of opposing side portions is located,
said water supply pipe is connected to said one end of said heat conduction pipe from the side of said one opposing side portion, and
said hot water delivery pipe is connected to the other end of said heat conduction pipe from the side of said one opposing side portion.

9. The water heater according to claim 1, wherein
said outlet port is provided on any of a side of the first through pipe located at one end in the second direction and a side of the first through pipe located at the other end in the second direction, among said plurality of first through pipes arranged along said second direction, on a side opposite to the side where said combustion portion is arranged with said heat exchanger lying therebetween.

10. The water heater according to claim 9, comprising:
a shell plate arranged to surround said plurality of fins and including a pair of opposing side portions opposed to each other at a distance in said first direction; and
a water supply pipe and a hot water delivery pipe, wherein both of one end and the other end of said heat conduction pipe are located on a side where one opposing side portion of said pair of opposing side portions is located,
said water supply pipe is connected to said one end of said heat conduction pipe from the side of said one opposing side portion, and
said hot water delivery pipe is connected to the other end of said heat conduction pipe from the side of said one opposing side portion.

11. The water heater according to claim 1, comprising:
a shell plate arranged to surround said plurality of fins and including a pair of opposing side portions opposed to each other at a distance in said first direction; and
a water supply pipe and a hot water delivery pipe, wherein both of one end and the other end of said heat conduction pipe are located on a side where one opposing side portion of said pair of opposing side portions is located,
said water supply pipe is connected to said one end of said heat conduction pipe from the side of said one opposing side portion, and
said hot water delivery pipe is connected to the other end of said heat conduction pipe from the side of said one opposing side portion.

12. A water heater provided with a heat exchanger, the heat exchanger including:
a plurality of fins each having a main surface and arranged at a distance from one another in a first direction intersecting said main surface; and
a heat conduction pipe including a plurality of through pipes extending along said first direction so as to pass through said plurality of fins and arranged as one connected pipe,
said heat conduction pipe including
a first-stage portion where a plurality of first through pipes among said plurality of through pipes are arranged at a first pitch along a second direction intersecting said first direction, and
a second-stage portion where a plurality of second through pipes among said plurality of through pipes are arranged at a second pitch along said second direction,
said first through pipes and said second through pipes being equal in number,
said plurality of first through pipes and said plurality of second through pipes being arranged as a part of said one connected pipe, and
said plurality of first through pipes and said plurality of second through pipes passing through each of the plurality of fins as a single continuous through pipe, the water heater comprising:
a combustion portion sending a combustion gas to said heat exchanger; and
an exhaust collection and guide member arranged opposite to a side where said combustion portion is arranged with said heat exchanger lying therebetween and having an outlet port through which the combustion gas after heat exchange in said heat exchanger flows out, wherein
said heat exchanger is arranged either above or below said combustion portion,
said first-stage portion is located on a side relatively closer than the second-stage portion to said combustion portion,
said second-stage portion is located on a side relatively farther than the first-stage portion from said combustion portion,
said second pitch in said second-stage portion is set to be shorter than said first pitch in said first-stage portion,
a total number of through pipes in each of the first-stage portion and the second-stage portion is 2(n+1);

when n is an odd number, the following relation is satisfied:

$a/2 > a/2 - b/2 > 1$ mm; and when n is an even number, the following relation is satisfied:

$a/2 \geq a - b > 1$ mm, where n is an integer, a is the first pitch, and b is the second pitch, and the first pitch is a distance between centers of adjacent ones of the plurality of first through pipes in the second direction and the second pitch is a distance between centers of adjacent ones of the plurality of second through pipes in the second direction.

* * * * *